United States Patent
Zhang et al.

(10) Patent No.: US 9,696,587 B2
(45) Date of Patent: Jul. 4, 2017

(54) BACKLIGHT MODULE BACKPLANE AND BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Zuwei Zhang, Guangdong (CN); Yujun Xiao, Guangdong (CN); Guofu Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 133 days.

(21) Appl. No.: 14/416,632

(22) PCT Filed: Nov. 28, 2014

(86) PCT No.: PCT/CN2014/092533
§ 371 (c)(1),
(2) Date: Jan. 22, 2015

(87) PCT Pub. No.: WO2016/023300
PCT Pub. Date: Feb. 18, 2016

(65) Prior Publication Data
US 2016/0048059 A1 Feb. 18, 2016

(30) Foreign Application Priority Data
Aug. 12, 2014 (CN) .......................... 2014 1 0395820

(51) Int. Cl.
*G02F 1/1345* (2006.01)
*G02F 1/1335* (2006.01)
*G02F 1/1333* (2006.01)

(52) U.S. Cl.
CPC ...... *G02F 1/133608* (2013.01); *G02F 1/1336* (2013.01); *G02F 2001/133314* (2013.01)

(58) Field of Classification Search
CPC ............. G02F 1/133608; G02F 1/1336; G02F 2001/133314
See application file for complete search history.

(56) References Cited

U.S. PATENT DOCUMENTS

2014/0009914 A1* 1/2014 Cho .......................... G09F 9/35
362/97.3

OTHER PUBLICATIONS

Ishimoto Yoshitake, Japanese Patent Application 2013-167804, Aug. 2013, machine translation and foreign.*

* cited by examiner

*Primary Examiner* — Tracie Y Green
(74) *Attorney, Agent, or Firm* — Andrew C. Cheng (57) ABSTRACT

Disclosed is a backlight module backplane, which includes a frame and a board. The frame includes a first sidewall, a top wall, a second sidewall, and a bottom wall that are sequentially connected in an end-to-end manner. The first sidewall and the second sidewall are of a straight plate structure. The top wall and the bottom wall are of a curved plate structure. The board has four edges respectively positioned against and fixed to the first sidewall, the top wall, the second sidewall and the bottom wall, so that the frame sets the board in a form of a curved surface. The backlight module backplane has reliable accuracy of curvature, a reduced weight, and a low cost. Also disclosed are a backlight module and a liquid crystal display device.

15 Claims, 7 Drawing Sheets

BACKLIGHT MODULE BACKPLANE AND BACKLIGHT MODULE AND LIQUID CRYSTAL DISPLAY DEVICE

CROSS REFERENCE TO RELATED APPLICATIONS

This application claims the priority of Chinese Patent Application No. 201410395820.5, entitled "Backlight Module Backplane and Backlight Module and Liquid Crystal Display Device", filed on Aug. 12, 2014, the disclosure of which is incorporated herein by reference in its entirety.

BACKGROUND OF THE INVENTION

1. Field of the Invention

The present invention relates to the field of liquid crystal displaying, and in particular to a backlight module backplane and a backlight module for use in a curved liquid crystal display device.

2. The Related Arts

With the sizes of flat panel televisions getting larger and larger, when people are viewing televisions, the difference between distances of images at a middle and an edge of a television screen and the viewers' eyes gets increasingly enlarged, leading to deformation and color distortion of the image appearing at the edges of a television screen. A curved television provides a better viewing effect than a flat panel television does. Heretofore, the structure of a backplane of a curved liquid crystal backlight module is achieved with two ways. The first one is that multiple sections of curved or bent metal plates are lapped to form a curved backplane structure. Such a structure suffers various problems of instable accuracy of curvature, a large number of parts used, and being hard to machine and process. The second way is that a die or mold is used to directly shape the entirety of a curved metal backplane. Such a unitarily formed metal backplane formed with a die or mold has large thickness and weight and the cost is also high.

Thus, it is an issue of the industry to further develop to provide a backlight module backplane that has reliable accuracy of curvature, a low weight, and a low cost.

SUMMARY OF THE INVENTION

A technical issue to be addressed in the present invention is to provide a backlight module backplane, which has advantages of having reliable accuracy of curvature, low weight, and low cost.

To achieve the above object, the present invention provides the following technical solutions:

In one aspect, the present invention provides a backlight module backplane, which comprises a frame and a board. The frame comprises a first sidewall, a top wall, a second sidewall, and a bottom wall that are sequentially connected in an end-to-end manner. The first sidewall and the second sidewall are of a straight plate structure. The top wall and the bottom wall are of a curved plate structure. The board has four edges respectively positioned against and fixed to the first sidewall, the top wall, the second sidewall, and the bottom wall, so that the frame sets the board in a form of a curved surface.

In the above backlight module backplane, the top wall and the bottom wall have the same curvature radius.

In the above backlight module backplane, the first sidewall, the top wall, the second sidewall, and the bottom wall are connected at connections by being respectively fixed and connected by coupling angle pieces.

In the above backlight module backplane, the backlight module backplane further comprises a reinforcement rib. The reinforcement rib is of a curved plate structure. The reinforcement rib is located between the top wall and the bottom wall and substantially parallel to the top wall and the bottom wall. The reinforcement rib is mounted to the board.

In the above backlight module backplane, the reinforcement rib comprises a reinforcement body and a pair of mounting flanges respectively mounted to two ends of the reinforcement body. The reinforcement body comprises a first top side, a pair of lateral sides, and first bottom sides. The lateral sides extend from opposite edges of the first top side in an inclined and diverging manner. The first bottom sides extend inwardly from edges of the lateral sides that are distant from the first top side. The first bottom sides are fixed to the board. The mounting flanges each comprise a second top side and a second bottom side. The second bottom side is inwardly folded and extends from an edge of the second top side toward the reinforcement body. The second bottom side is fixed to the board. The second top side is closer to the board than the first top side.

In the above backlight module backplane, the backlight module backplane further comprises a first connection piece and a second connection piece. The first connection piece connects one of the mounting flanges to the first sidewall. The second connection piece connects another one of the mounting flanges to the second sidewall.

In the above backlight module backplane, the board comprises a plurality of first through holes formed therein. The reinforcement rib comprises a plurality of second through holes. A plurality of single-sided countersunk rivets is applied in combination with the first through holes and the second through holes to fix the reinforcement rib to the board. The single-sided countersunk rivets each has an end that is a free end substantially flush with the board. The single-sided countersunk rivet has an opposite end that is a rivet head concealed in the interior of the reinforcement rib.

In the above backlight module backplane, the backlight module backplane further comprises a plurality of bolts. The plurality of bolts is fixed to the board.

In another aspect, the present invention provides a backlight module, which comprises a light panel, an optic film, a plastic frame, and a backlight module backplane. The light panel, the optic film, and the plastic frame are sequentially assembled on the backlight module backplane. The backlight module backplane comprises a frame and a board. The frame comprises a first sidewall, a top wall, a second sidewall, and a bottom wall that are sequentially connected in an end-to-end manner. The first sidewall and the second sidewall are of a straight plate structure. The top wall and the bottom wall are of a curved plate structure. The board has four edges respectively positioned against and fixed to the first sidewall, the top wall, the second sidewall, and the bottom wall, so that the frame sets the board in a form of a curved surface.

In the above backlight module, the backlight module backplane further comprises a reinforcement rib. The reinforcement rib is of a curved plate structure. The reinforcement rib is located between the top wall and the bottom wall and substantially parallel to the top wall and the bottom wall. The reinforcement rib is mounted to the board.

In the above backlight module, the reinforcement rib comprises a reinforcement body and a pair of mounting flanges respectively mounted to two ends of the reinforcement body. The reinforcement body comprises a first top side, a pair of lateral sides, and first bottom sides. The lateral sides extend from opposite edges of the first top side in an inclined and diverging manner. The first bottom sides extend inwardly from edges of the lateral sides that are distant from the first top side. The first bottom sides are fixed to the board. The mounting flanges each comprise a second top side and a second bottom side. The second bottom side is inwardly folded and extends from an edge of the second top side toward the reinforcement body. The second bottom side is fixed to the board. The second top side is closer to the board than the first top side.

In the above backlight module, the backlight module backplane further comprises a first connection piece and a second connection piece. The first connection piece connects one of the mounting flanges to the first sidewall. The second connection piece connects another one of the mounting flanges to the second sidewall.

In the above backlight module, the board comprises a plurality of first through holes formed therein. The reinforcement rib comprises a plurality of second through holes. A plurality of single-sided countersunk rivets is applied in combination with the first through holes and the second through holes to fix the reinforcement rib to the board. The single-sided countersunk rivets each has an end that is a free end substantially flush with the board. The single-sided countersunk rivet has an opposite end that is a rivet head concealed in the interior of the reinforcement rib.

In a further aspect, the present invention provides a liquid crystal display device, which comprises a liquid crystal panel. The liquid crystal display device further comprises a backlight module. The liquid crystal panel is mounted to the backlight module, so that the backlight module provides light to the liquid crystal panel to allow the liquid crystal panel to display an image. The backlight module comprises a light panel, an optic film, a plastic frame, and a backlight module backplane. The light panel, the optic film, and the plastic frame are sequentially assembled on the backlight module backplane. The backlight module backplane comprises a frame and a board. The frame comprises a first sidewall, a top wall, a second sidewall, and a bottom wall that are sequentially connected in an end-to-end manner. The first sidewall and the second sidewall are of a straight plate structure. The top wall and the bottom wall are of a curved plate structure. The board has four edges respectively positioned against and fixed to the first sidewall, the top wall, the second sidewall, and the bottom wall, so that the frame sets the board in a form of a curved surface.

In the above liquid crystal display device, the backlight module backplane further comprises a reinforcement rib. The reinforcement rib is of a curved plate structure. The reinforcement rib is located between the top wall and the bottom wall and substantially parallel to the top wall and the bottom wall. The reinforcement rib is mounted to the board.

In the above liquid crystal display device, the reinforcement rib comprises a reinforcement body and a pair of mounting flanges respectively mounted to two ends of the reinforcement body. The reinforcement body comprises a first top side, a pair of lateral sides, and first bottom sides. The lateral sides extend from opposite edges of the first top side in an inclined and diverging manner. The first bottom sides extend inwardly from edges of the lateral sides that are distant from the first top side. The first bottom sides are fixed to the board. The mounting flanges each comprise a second top side and a second bottom side. The second bottom side is inwardly folded and extends from an edge of the second top side toward the reinforcement body. The second bottom side is fixed to the board. The second top side is closer to the board than the first top side.

In the above liquid crystal display device, the backlight module backplane further comprises a first connection piece and a second connection piece. The first connection piece connects one of the mounting flanges to the first sidewall. The second connection piece connects another one of the mounting flanges to the second sidewall.

In the above liquid crystal display device, the board comprises a plurality of first through holes formed therein. The reinforcement rib comprises a plurality of second through holes. A plurality of single-sided countersunk rivets is applied in combination with the first through holes and the second through holes to fix the reinforcement rib to the board. The single-sided countersunk rivets each has an end that is a free end substantially flush with the board. The single-sided countersunk rivet has an opposite end that is a rivet head concealed in the interior of the reinforcement rib.

The present invention provides the top wall and the bottom wall that are arranged as curved plate structures to have the board fixed to the frame so as to form a configuration of a curved surface. Due to the deformability of the board and the frame setting the board to a curved configuration, the backlight module backplane can be formed with advantages of being light weight and low cost. Since the four edges of the board are fixed to the frame, the curvature of the top wall and the bottom wall helps set the board in the form of the curved surface. In other words, setting the curvature of the top wall and the bottom wall would determine the curvature of the entire backlight module backplane so that the accuracy of the curvature of the backlight module backplane can be made reliable.

BRIEF DESCRIPTION OF THE DRAWINGS

To more clearly illustrate the technical solutions proposed in the present invention, a brief description of the drawings that are necessary for describing embodiments of the present invention is given below. It is obvious that the drawings that will be described below show only some embodiments of the present invention and for those having ordinary skills of the art, other drawings may also be readily available from these attached drawings without the expense of creative effort and endeavor.

DETAILED DESCRIPTION OF THE PREFERRED EMBODIMENTS

A clear and complete description will be given to technical solutions of the embodiments of the present invention with reference to the attached drawings of the embodiments of the present invention.

Figure 1:
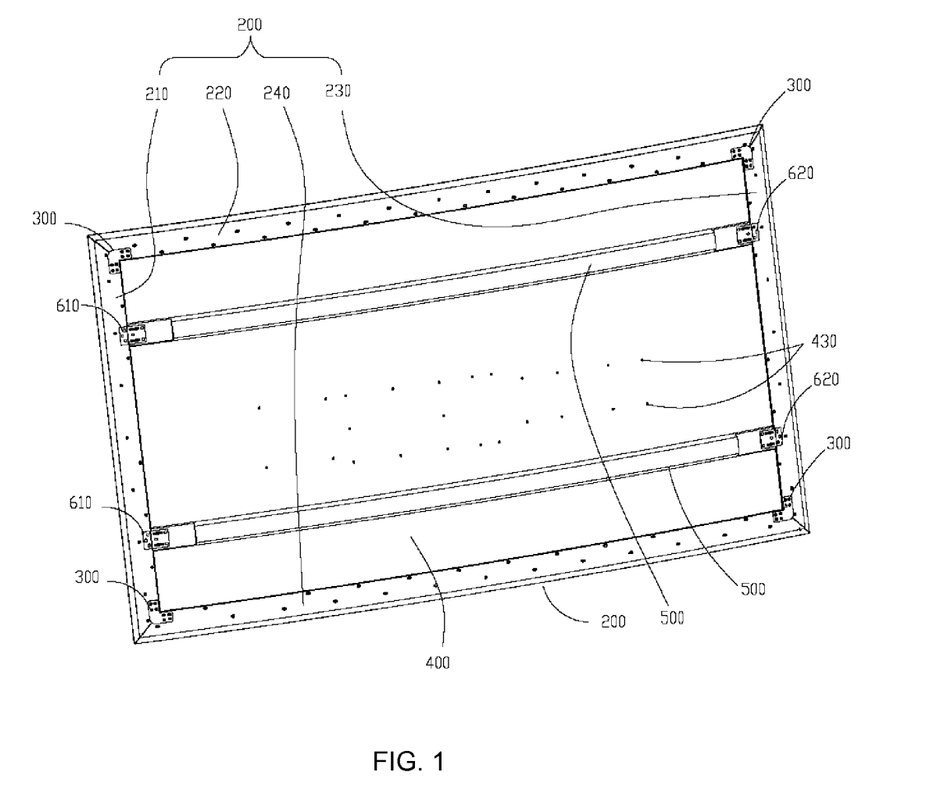
FIG. 1 is a schematic view showing a backlight module backplane according to an embodiment of the present invention.
Figure 2:
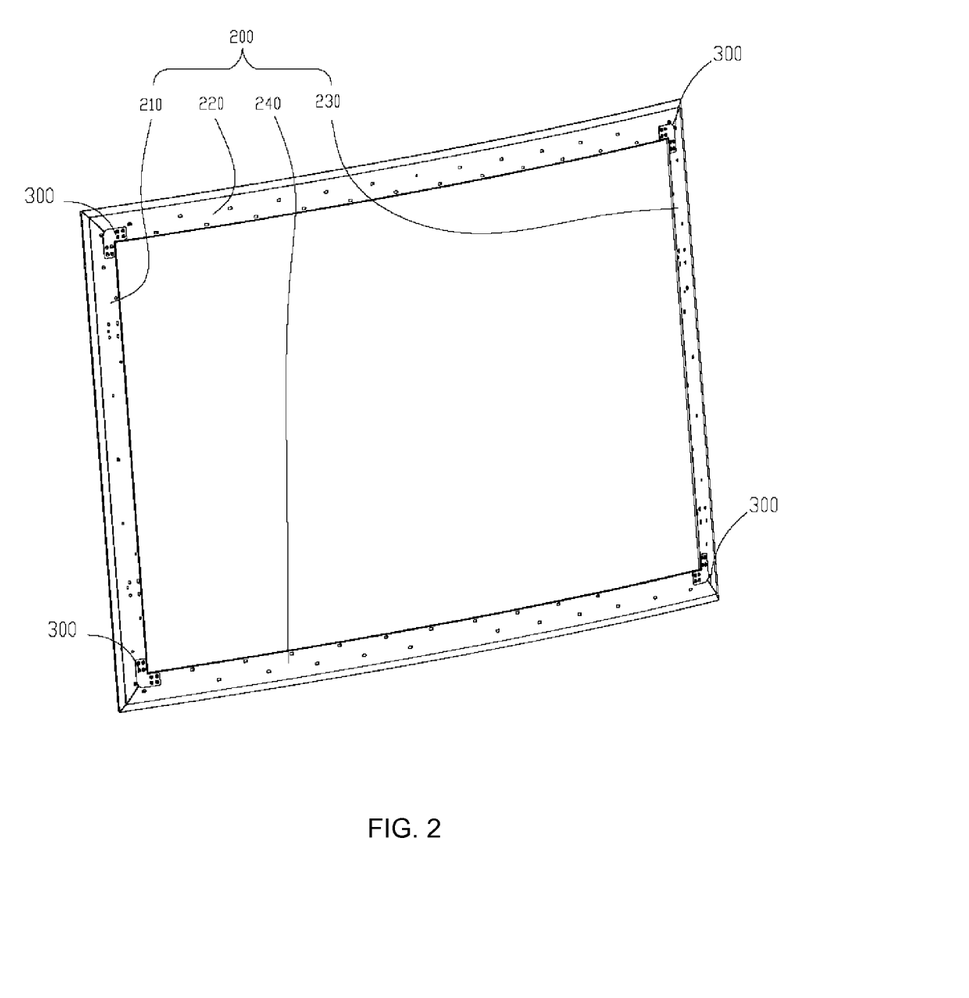
FIG. 2 is a schematic view showing a frame of the backlight module backplane according to an embodiment of the present invention.
Figure 3:
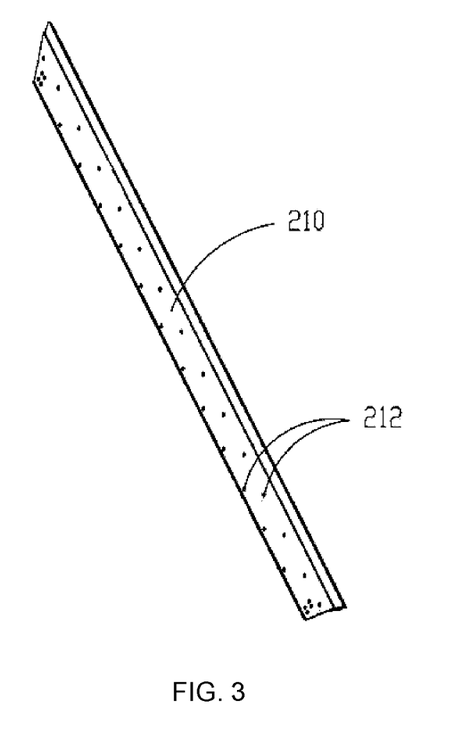
FIG. 3 is a schematic view showing a portion of a first sidewall or a second sidewall of the frame of the backlight module backplane according to an embodiment of the present invention.
Figure 4:
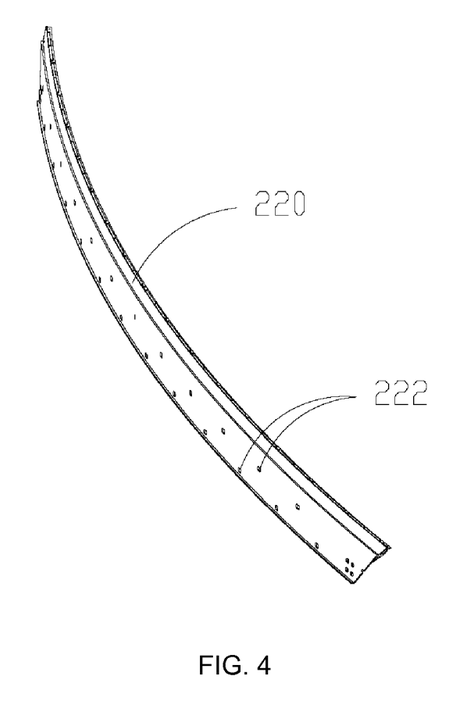
FIG. 4 is a schematic view showing a portion of a top wall or a bottom wall of the frame of the backlight module backplane according to an embodiment of the present invention.

As shown in FIGS. 1-4, the present invention provides a backlight module backplane, which comprises a frame 200 and a board 400. The frame 200 comprises a first sidewall 210, a top wall 220, a second sidewall 230, and a bottom wall 240 that are connected sequentially to each other in an end-to-end manner. In the instant embodiment, the frame 200 is formed by jointing four aluminum extrusion members together. The four aluminum extrusion members are made with the same mold. In other embodiments, the frame 200 is alternatively formed as a unitary structure. The first sidewall 210 and the second sidewall 230 are each of a straight plate structure, while the top wall 220 and the bottom wall 240 are each of a curved plate structure. Specifically, the top wall 220 and the bottom wall 240 are formed by processing straight plate structures into curved plate structures of desired curvature radii through cold forming and bending. The first sidewall 210, the top wall 220, the second sidewall 230, and the bottom wall 240 are each provided with through holes for mounting to the board 400. As shown in FIG. 3, the first sidewall 210 is of a straight plate structure, which comprises through holes 212 formed therein and as shown in FIG. 4, the top wall 220 is of a curved plate structure, which comprises through holes 222 formed therein. The board 400 has four edges that are respectively positioned against and fixed to the first sidewall 210, the top wall 220, the second sidewall 230 and the bottom wall 240, so that the frame 200 sets the board 400 in a form of a curved surface.

The present invention provides the top wall 220 and the bottom wall 240 that are arranged as curved plate structures to have the board 400 fixed to the frame 200 so as to form a configuration of a curved surface. Due to the deformability of the board 400 and the frame 200 setting the board 400 to a curved configuration, the backlight module backplane can be formed with advantages of being light weight and low cost. Since the four edges of the board 400 are fixed to the frame 200, the curvature of the top wall 220 and the bottom wall 240 helps set the board 400 in the form of the curved surface. In other words, setting the curvature of the top wall 220 and the bottom wall 240 would determine the curvature of the entire backlight module backplane so that the accuracy of the curvature of the backlight module backplane can be made reliable.

In the instant embodiment, the top wall 220 and the bottom wall 240 have the same curvature radii. In other words, the top wall 220 and the bottom wall 240 are of same structure. Similarly, the first sidewall 210 and the second sidewall 230 can be of identical structure so that the frame 200 has a symmetric structure, making the processing easy and assembling simplified.

In the instant embodiment, the first sidewall 210, the top wall 220, the second sidewall 230, and the bottom wall 240 are securely connected to each other with coupling angle pieces 300 mounted to connections therebetween. As shown in FIG. 1, the backlight module backplane comprises four coupling angle pieces 300, which are respectively set at four corners and screws are used in combination with the coupling angle pieces 300 to securely fix the first sidewall 210, the top wall 220, the second sidewall 230, and the bottom wall 240 together at the connections therebetween so as to form a unitarily connected structure.

Figure 5:
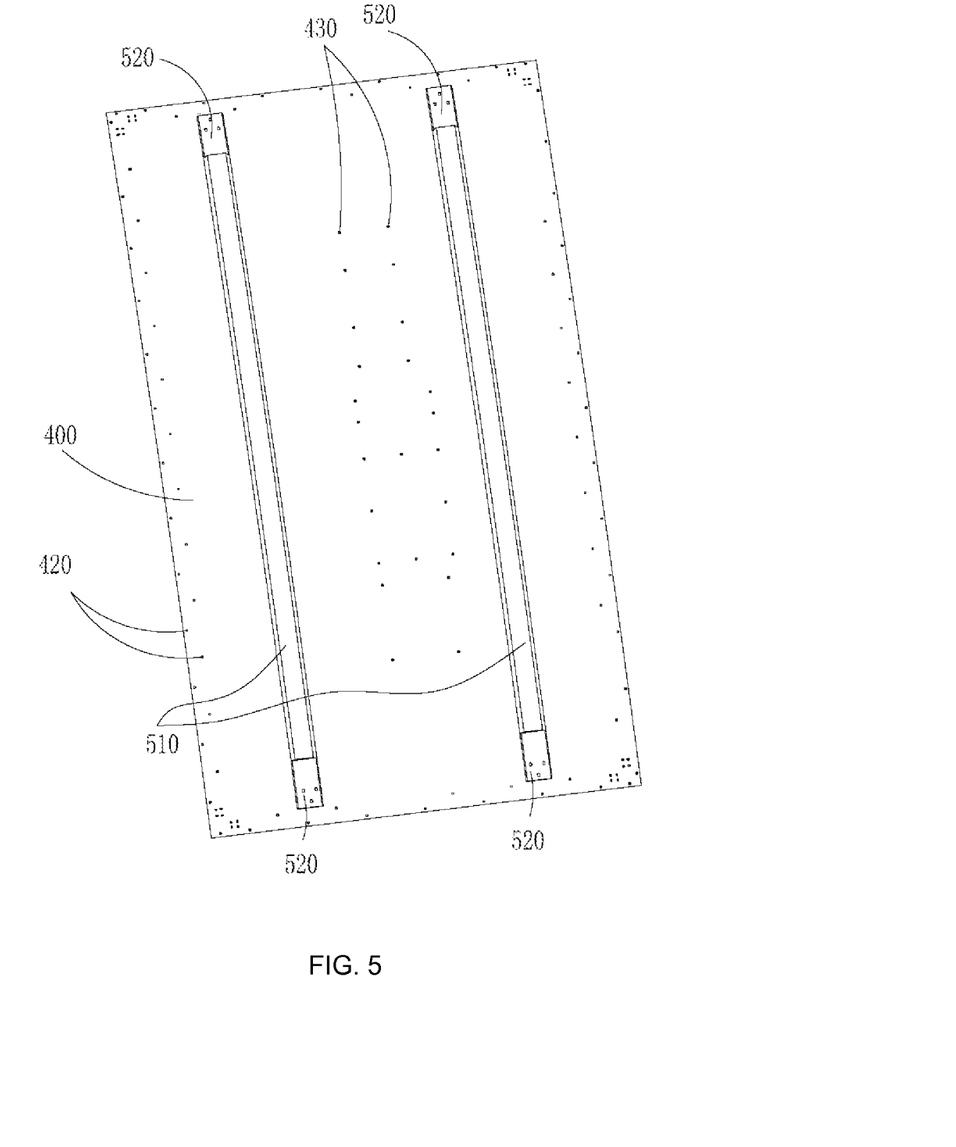
FIG. 5 is a schematic view showing a board and reinforcement ribs of the backlight module backplane according to an embodiment of the present invention.

In the instant embodiment, the backlight module backplane further comprises reinforcement ribs 500. The reinforcement ribs 500 are of curved plate structures. The reinforcement ribs 500 are located between the top wall 220 and the bottom wall 240. The top wall 220 and the bottom wall 240 are substantially parallel to each other and thus, the reinforcement ribs 500 are also substantially parallel to the top wall 220 and the bottom wall 240. The reinforcement ribs 500 are mounted to the board 400. The reinforcement ribs 500 function to increase the structural strength of the board 400 in order to ensure the stability of the backlight module backplane.

Figure 7:
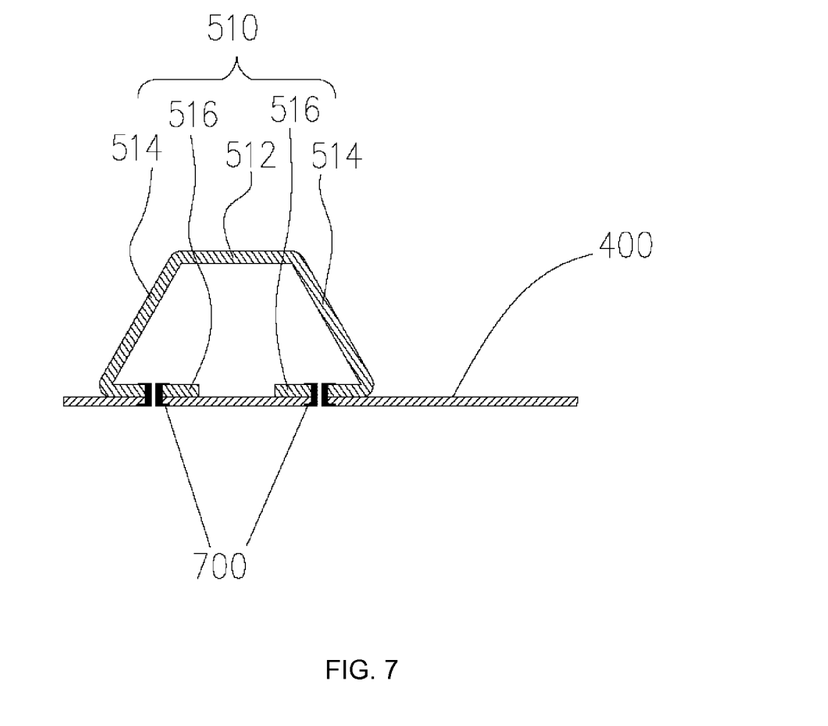
FIG. 7 is a schematic view showing a connection arrangement between a reinforcement body of the reinforcement rib and the board of the backlight module backplane according to an embodiment of the present invention.
Figure 8:
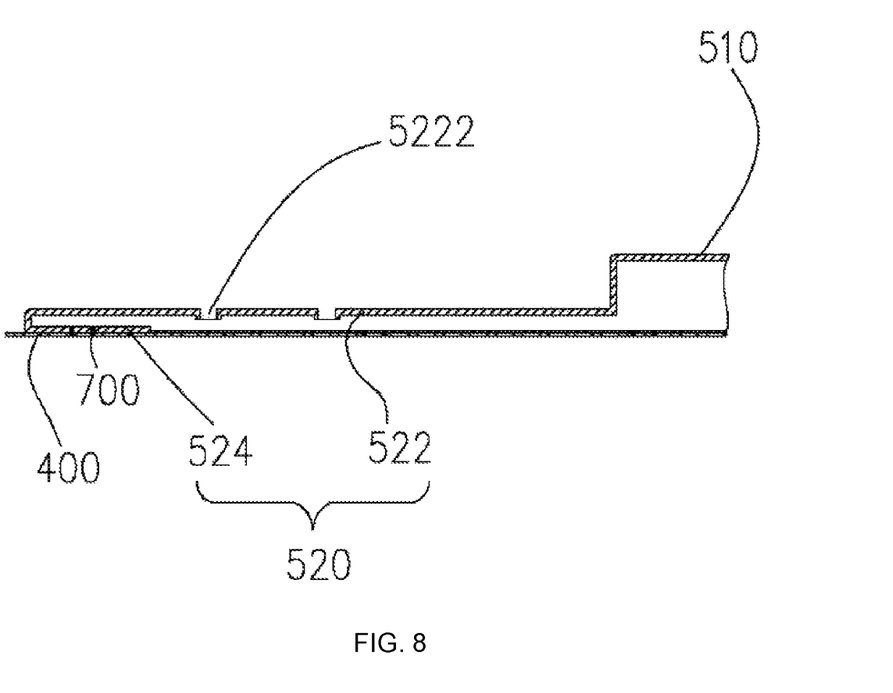
FIG. 8 is a schematic view showing a connection arrangement between mounting flanges of the reinforcement rib and the board of the backlight module backplane according to an embodiment of the present invention.

Specifically, the reinforcement ribs 500 each comprise a reinforcement body 510 and a pair of mounting flanges 520 respectively formed at opposite ends of the reinforcement body 510. As shown in FIG. 7, the reinforcement body 510 has a trapezoidal cross section and the reinforcement body 510 comprises a first top side 512, a pair of lateral sides 514, and first bottom sides 516. The pair of lateral sides 514 respectively extends from opposite edges of the first top side 512 in an inclined and diverging manner. The first bottom sides 516 respectively extend inward from edges of the lateral sides 514 that are distant from the first top side 512. The first bottom sides 516 are fixed to the board 400. As shown in FIG. 8, the mounting flanges 520 each comprise a second top side 522 and a second bottom side 524. The second bottom side 524 is inwardly folded and extends from an edge of the second top side 522 toward the reinforcement body 510. The second bottom side 524 is fixed to the board 400. The second top side 522 is arranged to be closer to the board 400 than the first top side 512. In other words, a vertical distance between the second top side and the board 400 is smaller than a vertical distance between the first top side 512 and the board 400.

In addition, the backlight module backplane further comprises a first connection piece 610 and a second connection piece 620 associated with each of reinforcement ribs. The first connection piece 610 connects one of the mounting flanges 520 to the first sidewall 210, and the second connection piece 620 connects another one of the mounting flanges 520 the second sidewall 230. Further referring to FIG. 8, the second top side 522 of each of the mounting flanges 520 comprises threaded holes 5222 formed therein and the threaded holes 5222 are provided for coupling with the first connection piece 610 or the second connection piece 620. Since the second top side 522 is closer to the board 400 than the first top side 512, after the first connection piece 610 and the second connection piece 620 are mounted to the mounting flanges 520, the altitude of the first connection piece 610 and the second connection piece 620 with respect to the board 400 is not higher than the overall height of the reinforcement rib 500 so that the overall thickness of the backlight module backplane is controlled.

Figure 6:
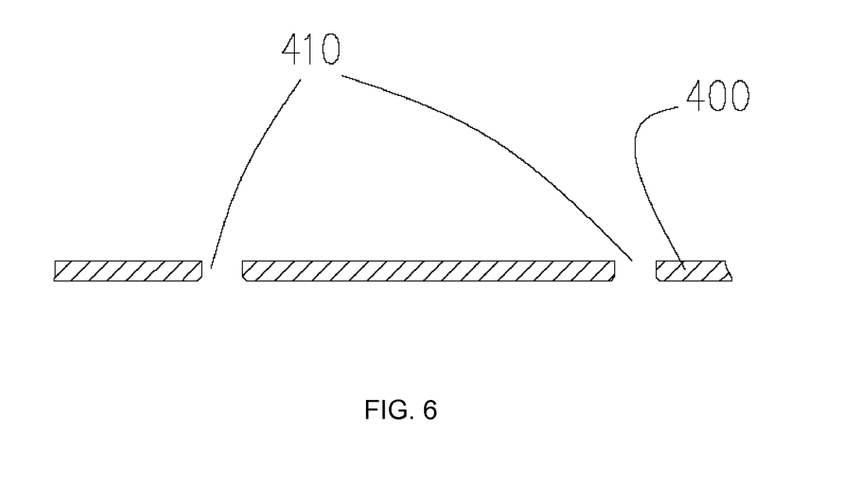
FIG. 6 is a schematic view, in an enlarged form, showing a portion of the board of the backlight module backplane according to an embodiment of the present invention.

In the instant embodiment, as shown in FIG. 6, the board 400 comprises a plurality of first through holes 410 formed therein. The reinforcement ribs 500 each comprise a plurality of second through holes (not shown) formed therein. By applying single-sided countersunk rivets 700 in combination with the first through holes 410 and the second through holes, the reinforcement ribs 500 are fixed to the board 400.

As shown in FIGS. 7 and 8, the single-sided countersunk rivets 700 each have an end that is a free end flush with the board 400 and an opposite end of the single-sided countersunk rivet 700 is a rivet head that is concealed in the interior of the reinforcement rib 500. Such an arrangement ensures surface smoothness of the backlight module backplane and not affecting outside appearance.

Further, referring to FIGS. 1 and 5, the backlight module backplane further comprises a plurality of bolts 430. The plurality of bolts 430 is fixed to the board 400 for coupling a circuit board or other electronic components to the board 400.

In another aspect, the present invention also provides a backlight module, which comprises a light panel, an optic film, a plastic frame, and a backlight module backplane. The light panel, the optic film, and the plastic frame are sequentially assembled on the backlight module backplane.

In a further aspect, the present invention further provides a liquid crystal display device, which comprises the liquid crystal panel and the backlight module. The liquid crystal panel is mounted to the backlight module so that the backlight module provides light to the liquid crystal panel to allow the liquid crystal panel to display an image.

Disclosed above are only the preferred embodiments of the present invention. It is appreciated that those having ordinary skills of the art may readily appreciate various improvements and modifications without departing from the principle of the present invention and these improvements and modifications are considered within the protection scope of the present invention.

What is claimed is:

1. A backlight module backplane, comprising a frame and a board, the frame comprising a first sidewall, a top wall, a second sidewall, and a bottom wall that are sequentially connected in an end-to-end manner, the first sidewall and the second sidewall being of a straight plate structure, the top wall and the bottom wall being of a curved plate structure, the board having four edges respectively positioned against and fixed to the first sidewall, the top wall, the second sidewall, and the bottom wall, so that the frame sets the board in a form of a curved surface;

wherein a reinforcement rib comprises a reinforcement body having two opposite ends each forming a mounting flange, the mounting flanges being respectively connected by a first connection piece and a second connection piece to the first sidewall and the second sidewall, the reinforcement body having a first top side and an opposite first bottom side that is fixed to the board such that the mounting flanges respectively located adjacent to the first sidewall and the second sidewall of the frame, the first top side being distant from the first bottom side by a first distance in a direction away from the board, each of the mounting flanges comprising a second top side and an opposite second bottom side that is fixed to the board, the second top side of the mounting flange being spaced from the second bottom side by a second distance in the direction away from the board, wherein the first bottom side and the second bottom side are mounted fixed to the board and are substantially coplanar such that the second distance is smaller than the first distance to make the second top side closer to the board than the first side and a stepped space is formed between the first top side and the second top side; and wherein the first connection piece is partly positioned on the second top side of one of the mounting flanges that is adjacent to the first sidewall and is received in the stepped space without projecting beyond the first top side of the reinforcement body in the direction away from the board and the second connection piece is partly positioned on the second top side of one of the mounting flanges that is adjacent to the second sidewall and is received in the stepped space without projecting beyond the first top side of the reinforcement body in the direction away from the board, the first connection piece and the second connection piece being respectively mounted to the mounting flanges of the reinforcement body and also mounted to the first and second sidewalls of the frame.

2. The backlight module backplane as claimed in claim 1, wherein the top wall and the bottom wall have the same curvature radius.

3. The backlight module backplane as claimed in claim 2, wherein the first sidewall, the top wall, the second sidewall, and the bottom wall are connected at connections by being respectively fixed and connected by coupling angle pieces.

4. The backlight module backplane as claimed in claim 1, wherein the reinforcement rib is of a curved plate structure, the reinforcement rib being located between the top wall and the bottom wall and substantially parallel to the top wall and the bottom wall.

5. The backlight module backplane as claimed in claim 1, wherein the reinforcement body further comprises a pair of lateral sides extending from opposite edges of the first top side in an inclined and diverging manner, and the first bottom side extends inwardly from edges of the lateral sides that are distant from the first top side.

6. The backlight module backplane as claimed in claim 1, wherein the board comprises a plurality of first through holes formed therein, the reinforcement rib comprising a plurality of second through holes, a plurality of single-sided countersunk rivets being applied in combination with the first through holes and the second through holes to fix the reinforcement rib to the board, the single-sided countersunk rivets each having an end that is a free end substantially flush with the board, the single-sided countersunk rivet having an opposite end that is a rivet head concealed in the interior of the reinforcement rib.

7. The backlight module backplane as claimed in claim 1 further comprising a plurality of bolts, the plurality of bolts being fixed to the board for attaching external parts to the board.

8. A backlight module, comprising a light panel, an optic film, a plastic frame, and a backlight module backplane, the light panel, the optic film, and the plastic frame being sequentially assembled on the backlight module backplane, the backlight module backplane comprising a frame and a board, the frame comprising a first sidewall, a top wall, a second sidewall, and a bottom wall that are sequentially connected in an end-to-end manner, the first sidewall and the second sidewall being of a straight plate structure, the top wall and the bottom wall being of a curved plate structure, the board having four edges respectively positioned against and fixed to the first sidewall, the top wall, the second sidewall, and the bottom wall, so that the frame sets the board in a form of a curved surface;

wherein a reinforcement rib comprises a reinforcement body having two opposite ends each forming a mounting flange, the mounting flanges being respectively connected by a first connection piece and a second connection piece to the first sidewall and the second sidewall, the reinforcement body having a first top side and an opposite first bottom side that is fixed to the board such that the mounting flanges respectively located adjacent to the first sidewall and the second sidewall of the frame, the first top side being distant from the first bottom side by a first distance in a direction away from the board, each of the mounting flanges comprising a second top side and an opposite second bottom side that is fixed to the board, the second top side of the mounting flange being spaced from the second bottom side by a second distance in the direction away from the board, wherein the first bottom side and the second bottom side are mounted fixed to the board and are substantially coplanar such that the second distance is smaller than the first distance to make the second top side closer to the board than the first side and a stepped space is formed between the first top side and the second top side; and wherein the first connection piece is partly positioned on the second top side of one of the mounting flanges that is adjacent to the first sidewall and is received in the stepped space without projecting beyond the first top side of the reinforcement body in the direction away from the board and the second connection piece is partly positioned on the second top side of one of the mounting flanges that is adjacent to the second sidewall and is received in the stepped space without projecting beyond the first top side of the reinforcement body in the direction away from the board, the first connection piece and the second connection piece being respectively mounted to the mounting flanges of the reinforcement body and also mounted to the first and second sidewalls of the frame.

9. The backlight module as claimed in claim 8, wherein the reinforcement rib is of a curved plate structure, the reinforcement rib being located between the top wall and the bottom wall and substantially parallel to the top wall and the bottom wall.

10. The backlight module as claimed in claim 8, wherein the reinforcement body further comprises a pair of lateral sides extending from opposite edges of the first top side in an inclined and diverging manner, and the first bottom side extends inwardly from edges of the lateral sides that are distant from the first top side.

11. The backlight module as claimed in claim 8, wherein the board comprises a plurality of first through holes formed therein, the reinforcement rib comprising a plurality of second through holes, a plurality of single-sided countersunk rivets being applied in combination with the first through holes and the second through holes to fix the reinforcement rib to the board, the single-sided countersunk rivets each having an end that is a free end substantially flush with the board, the single-sided countersunk rivet having an opposite end that is a rivet head concealed in the interior of the reinforcement rib.

12. A liquid crystal display device, comprising a liquid crystal panel, the liquid crystal display device further comprising backlight module, the liquid crystal panel being mounted to the backlight module, so that the backlight module provides light to the liquid crystal panel to allow the liquid crystal panel to display an image, the backlight module comprising a light panel, an optic film, a plastic frame, and a backlight module backplane, the light panel, the optic film, and the plastic frame being sequentially assembled on the backlight module backplane, the backlight module backplane comprising a frame and a board, the frame comprising a first sidewall, a top wall, a second sidewall, and a bottom wall that are sequentially connected in an end-to-end manner, the first sidewall and the second sidewall being of a straight plate structure, the top wall and the bottom wall being of a curved plate structure, the board having four edges respectively positioned against and fixed to the first sidewall, the top wall, the second sidewall, and the bottom wall, so that the frame sets the board in a form of a curved surface;

wherein a reinforcement rib comprises a reinforcement body having two opposite ends each forming a mounting flange, the mounting flanges being respectively connected by a first connection piece and a second connection piece to the first sidewall and the second sidewall, the reinforcement body having a first top side and an opposite first bottom side that is fixed to the board such that the mounting flanges respectively located adjacent to the first sidewall and the second sidewall of the frame, the first top side being distant from the first bottom side by a first distance in a direction away from the board, each of the mounting flanges comprising a second top side and an opposite second bottom side that is fixed to the board, the second top side of the mounting flange being spaced from the second bottom side by a second distance in the direction away from the board, wherein the first bottom side and the second bottom side are mounted fixed to the board and are substantially coplanar such that the second distance is smaller than the first distance to make the second top side closer to the board than the first side and a stepped space is formed between the first top side and the second top side; and wherein the first connection piece is partly positioned on the second top side of one of the mounting flanges that is adjacent to the first sidewall and is received in the stepped space without projecting beyond the first top side of the reinforcement body in the direction away from the board and the second connection piece is partly positioned on the second top side of one of the mounting flanges that is adjacent to the second sidewall and is received in the stepped space without projecting beyond the first top side of the reinforcement body in the direction away from the board, the first connection piece and the second connection piece being respectively mounted to the mounting flanges of the reinforcement body and also mounted to the first and second sidewalls of the frame.

13. The liquid crystal display device as claimed in claim 12, wherein the reinforcement rib is of a curved plate structure, the reinforcement rib being located between the top wall and the bottom wall and substantially parallel to the top wall and the bottom wall.

14. The liquid crystal display device as claimed in claim 12, wherein the reinforcement body further comprises a pair of lateral sides extending from opposite edges of the first top side in an inclined and diverging manner, and the first bottom side extends inwardly from edges of the lateral sides that are distant from the first top side.

15. The liquid crystal display device as claimed in claim 12, wherein the board comprises a plurality of first through holes formed therein, the reinforcement rib comprising a plurality of second through holes, a plurality of single-sided countersunk rivets being applied in combination with the first through holes and the second through holes to fix the reinforcement rib to the board, the single-sided countersunk rivets each having an end that is a free end substantially flush with the board, the single-sided countersunk rivet having an opposite end that is a rivet head concealed in the interior of the reinforcement rib.

* * * * *